US012123437B2

(12) United States Patent
Rüegg

(10) Patent No.: US 12,123,437 B2
(45) Date of Patent: Oct. 22, 2024

(54) PNEUMATIC ACTUATOR, PRESSURE WAVE GENERATOR, AND METHOD FOR OPERATING A PRESSURE WAVE GENERATOR

(71) Applicant: P-Wave AG, Wallenschwil (CH)

(72) Inventor: Hans Rüegg, Waltenschwil (CH)

(73) Assignee: P-WAVE AG, Waltenschwil (CH)

( * ) Notice: Subject to any disclaimer, the term of this patent is extended or adjusted under 35 U.S.C. 154(b) by 554 days.

(21) Appl. No.: 15/733,594

(22) PCT Filed: Apr. 26, 2019

(86) PCT No.: PCT/EP2019/060795
§ 371 (c)(1),
(2) Date: Sep. 10, 2020

(87) PCT Pub. No.: WO2019/211204
PCT Pub. Date: Nov. 7, 2019

(65) Prior Publication Data
US 2021/0033118 A1   Feb. 4, 2021

(30) Foreign Application Priority Data

May 2, 2018   (CH) .......................................... 553/18

(51) Int. Cl.
*F15B 15/19*   (2006.01)
(52) U.S. Cl.
CPC .................................. *F15B 15/19* (2013.01)
(58) Field of Classification Search
CPC ......... G01B 1/104; G01B 1/116; F15B 15/19; F15B 15/14; B08B 7/026; G01V 1/104; G01V 1/116
See application file for complete search history.

(56) References Cited

U.S. PATENT DOCUMENTS

| 4,193,472 A | 3/1980 | Kirby |
| 4,700,611 A | 10/1987 | Kaneko |

(Continued)

FOREIGN PATENT DOCUMENTS

| CH | 25801 A | 6/1903 |
| DE | 613843 C | 5/1935 |

(Continued)

OTHER PUBLICATIONS

International Search Report in PCT application No. PCT/EP2019/060795, Oct. 25, 2019.

(Continued)

*Primary Examiner* — Kenneth Bomberg
*Assistant Examiner* — Daniel S Collins
(74) *Attorney, Agent, or Firm* — McCormick, Paulding & Huber PLLC

(57) ABSTRACT

A pneumatic actuator (4b), in particular for use in a pressure wave generator (1) comprises:
a first piston surface (91) which acts counter to a gaseous working medium in a first volume (41), wherein a pressure in the first volume (41) effects an actuator force in a first direction upon the first piston surface (91);
a second piston surface (92) which acts counter to the working medium in a second volume (42), wherein a pressure in the second volume (42) effects an actuator force in a second direction opposite to the first direction, upon the second piston surface (92);
a throttle between the first volume (41) and the second volume (42);
an inlet/outlet opening (45) of the first volume (41) for bringing the working medium into and discharging it out of, the first volume;

(Continued)

Figure 1:
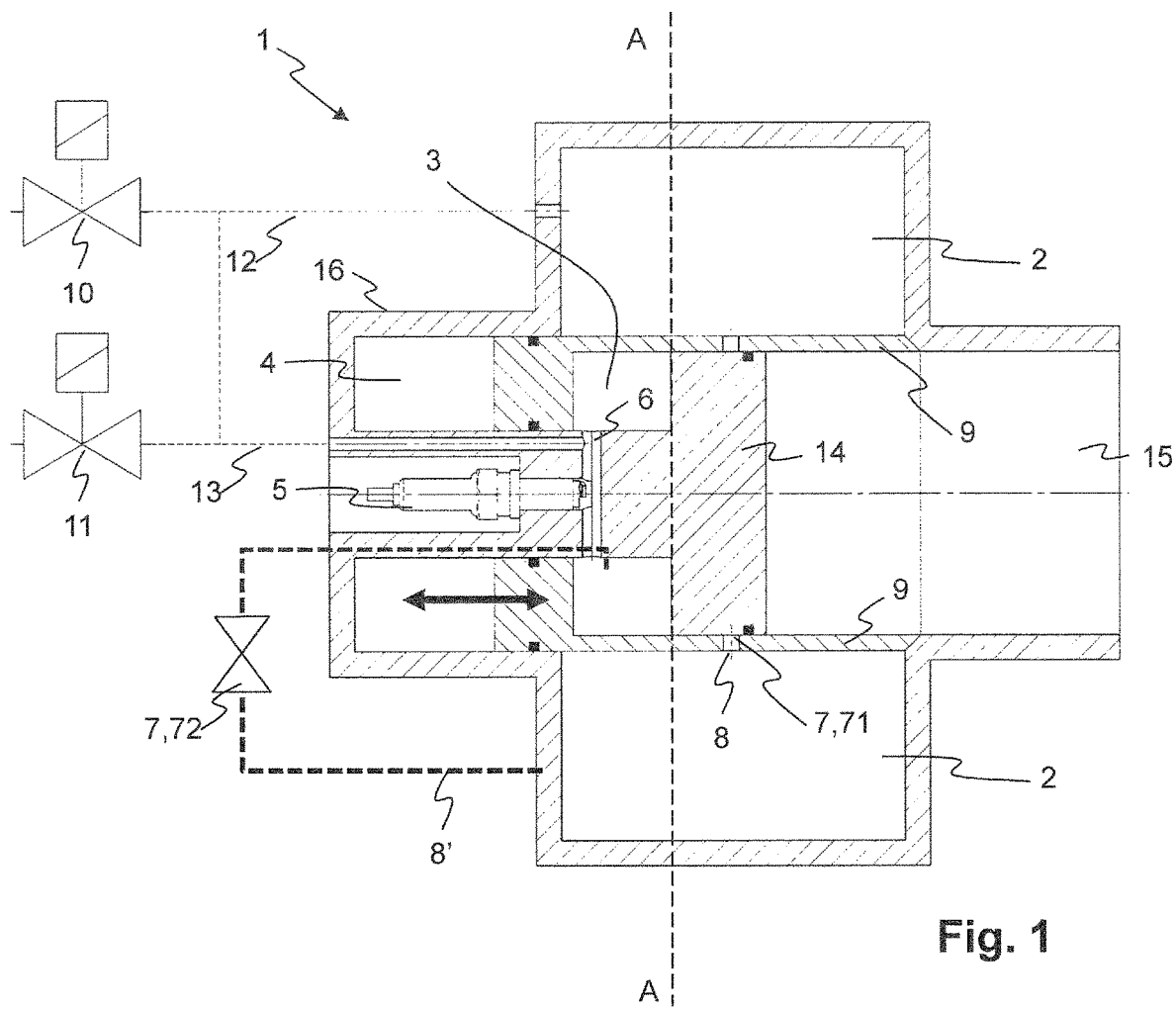

wherein the first piston surface (91) is larger than the second piston surface (92).

48 Claims, 3 Drawing Sheets

(56) References Cited

U.S. PATENT DOCUMENTS

| | | | |
|---|---|---|---|
| 5,082,502 A | 1/1992 | Lee | |
| 5,224,392 A | 7/1993 | Hutchison | |
| 8,967,034 B2 * | 3/2015 | Tunkers | ................. B25B 5/122 91/395 |
| 2002/0185330 A1 | 12/2002 | Kocharyan | |
| 2005/0126594 A1 | 6/2005 | Chenevert | |
| 2017/0037921 A1 | 2/2017 | Ogawa | |

FOREIGN PATENT DOCUMENTS

| | | | | |
|---|---|---|---|---|
| DE | 69302704 | | 1/1997 | |
| GB | 2125897 | | 3/1984 | |
| GB | 2457800 A | * | 9/2009 | ............. B60R 21/34 |
| WO | WO 2007/028264 A2 | | 3/2007 | |
| WO | WO 2010/025574 A2 | | 3/2010 | |
| WO | WO 2011/137543 A1 | | 11/2011 | |

OTHER PUBLICATIONS

Written Opinion in PCT application No. PCT/EP2019/060795, Oct. 15, 2019.

* cited by examiner

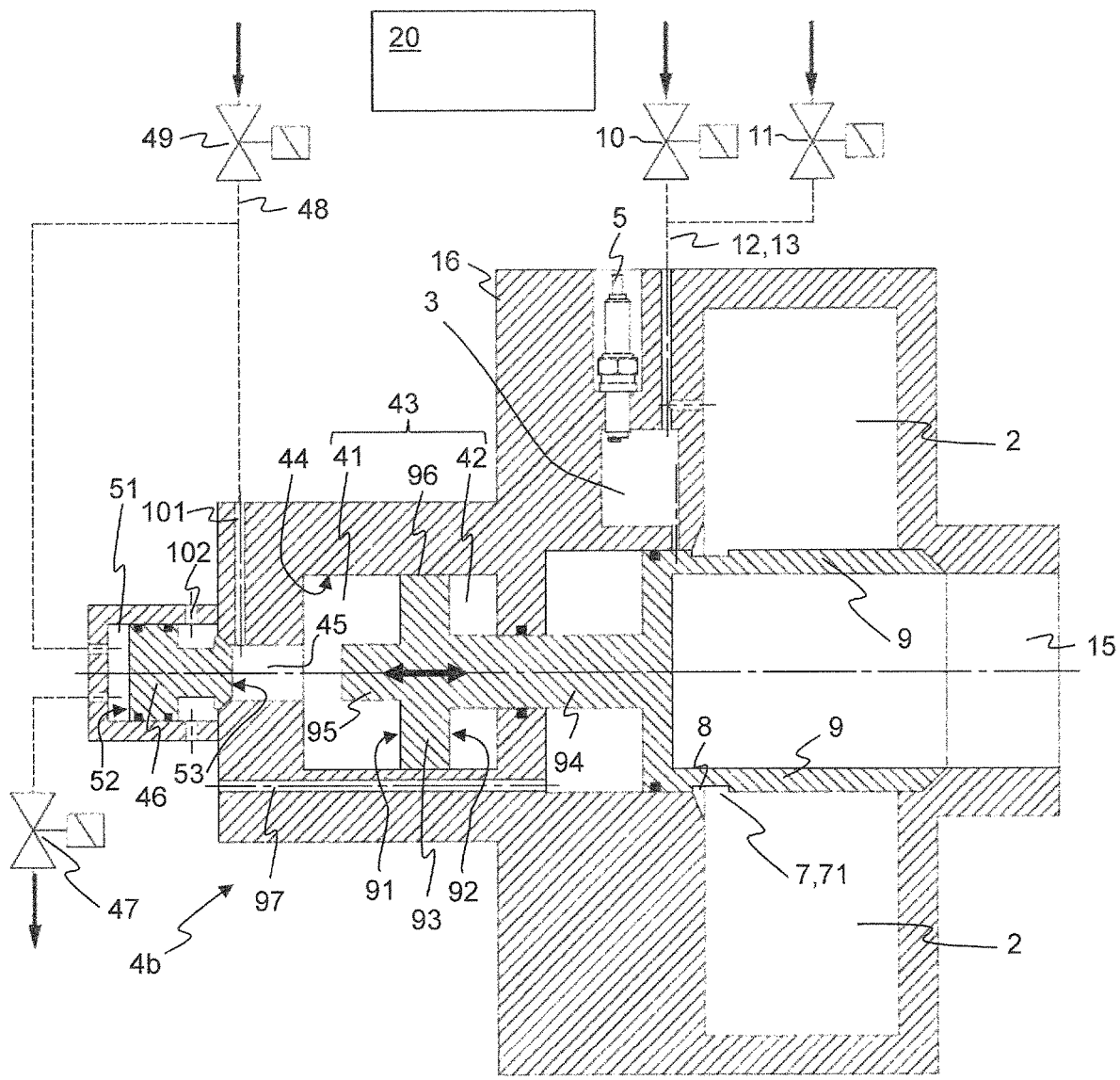
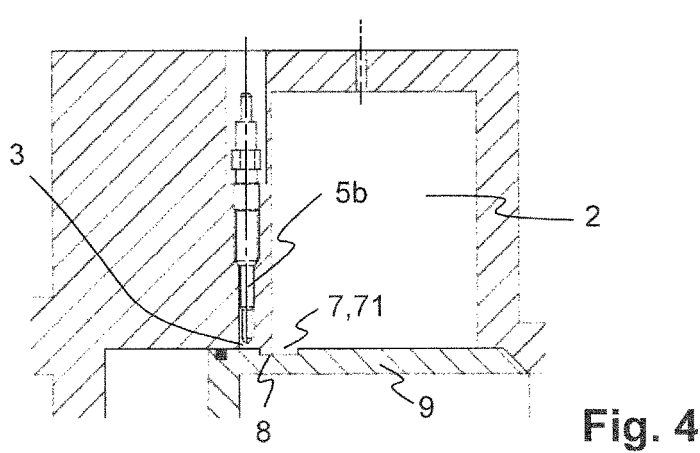
Fig. 3
Fig. 4

PNEUMATIC ACTUATOR, PRESSURE WAVE GENERATOR, AND METHOD FOR OPERATING A PRESSURE WAVE GENERATOR

The invention relates to a pneumatic actuator and to a device and to a method for generating explosions, in particular pressure impulses of a high intensity, according to the independent patent claims. In particular, it relates to a pressure wave generator and a method for operating a pressure wave generator, according to the preamble of the independent patent claims.

In pressure wave generators, as are described in WO 2007/028264 and in particular in WO 2010/025574, an auxiliary and a main explosion are ignited in chambers which are separated from one another. The auxiliary explosion serves for releasing a closure of the main explosion chamber in a direct manner or via other latching/bar mechanisms, so that the subsequent main explosion does not act upon the closure with the full force and accordingly compromises or damages this. Accordingly, an explosion delay takes place between the auxiliary and main explosion. Such a delay is effected for example by way of a delay conduit, in which an explosion is led from an auxiliary chamber into a main chamber, or by way of a delayed ignition in both chambers via separate ignition devices which are present in the chambers.

The two aforementioned documents WO 2007/028264 and WO 2010/025574 are referred to with regard to the construction and design of the ignition and explosion delay, as well as concerning exemplary embodiments and manners of functioning of the pressure wave generator.

In particular, in the pressure wave generator of the document WO 2010/025574, an auxiliary explosion chamber and main explosion chamber are sealed to one another via a movable piston. The piston further closes a discharge opening for a pressure wave which is produced in the main explosion chamber. The auxiliary explosion chamber and the main explosion chamber of the pressure wave generator are filled with an explosive gas mixture, typically at an overpressure, directly before an ignition of an explosion. Very high pressures of up to 1000 bar and temperatures of up to 4000° C. arise due to the gas explosions in the auxiliary and main explosion chamber. As a rule, the pressures lie above 500 bar and the temperatures above 2000° C.

The opening should be effected very quickly, in order on the one hand for the main explosion chamber not to be opened too early, since otherwise the explosion energy cannot be optimally utilised, and on the other hand for it to also not be opened too late, by which means the device can be destroyed. Hence there is a need for an actuator which permits a rapid opening of the piston, but which is herein able to handle the prevailing conditions, operating frequencies and forces, as occur in regard of a pressure wave generator.

It is therefore a possible object of the invention to provide a pneumatic actuator which is suitable for use with a pressure wave generator and which at least partly meets these demands.

The ignition in the main explosion chamber can be effected by way of a spark plug or an ignition conduit which comes from an auxiliary explosion chamber. With regard to a spark plug however, there exists the problem that this is greatly loaded by the explosion in the main explosion chamber, and/or that certain gas-air mixtures cannot be ignited at all at high pressures, e.g. a methane-air mixture. In the case of an ignition conduit, there is the problem that under certain circumstances, in particular with a long ignition conduit, this can only be filled with a combustible gas (for example methane, ethane, . . . ) or only with an oxidator (for example oxygen, air, . . . ) and cannot therefore lead the explosion further.

A further possible object of the invention is to provide a pressure wave generator and a method for operating a pressure wave generator of the aforementioned type which permits an improved control of the ignition of the explosion in the main explosion chamber.

A further possible object is to provide a pressure wave generator of the aforementioned type which realises an improved sealing between the auxiliary explosion chamber and the main explosion chamber.

At least one of these objects is achieved by a pneumatic actuator, a pressure wave generator or a method for operating a pneumatic actuator or a pressure wave generator, according to the patent claims.

According to a first aspect of the invention, there is present: a pneumatic actuator, in particular for use in a pressure wave generator according to the second aspect, comprising
  a first piston surface which acts counter to a gaseous working medium in a first volume, wherein a pressure in the first volume effects an actuator force in the first direction upon the first piston surface;
  a second piston surface which acts counter to the working medium in a second volume, wherein a pressure in the second volume effects an actuator force in a second direction which is opposite to the first direction, upon the second piston surface;
  a throttle between the first volume and the second volume;
  an inlet/outlet opening of the first volume for bringing the working medium into and discharging it out of the first volume;
  wherein the first piston surface is larger than the second piston surface.

In embodiments, the pneumatic actuator comprises an end-position damping, in particular by way of closing the inlet/outlet opening. Herewith therefore, the inlet/outlet opening is closed with respect to the first volume.

In embodiments, a piston closure element is arranged for closing the inlet/outlet opening. Herewith, the end-position damping can be realised in a simple manner by an element of the piston itself.

In a method for operating the pneumatic actuator, the following steps are carried out:
  filling the first volume with a gaseous working medium which is under pressure, in particular by way of a filling valve, for example a pressurised air valve;
  pressure compensation between the first volume and the second volume through the throttle and, by way of this, on account of a surface area difference between the first piston surface and the second piston surface, moving the actuator in the first direction;
  discharging at least a part of the working medium out of the first volume, in particular by way of opening the inlet/outlet opening;
  by way of a more rapid pressure drop in the first volume than in the second volume, moving the actuator in the second direction.

It is therefore possible, with simple means—only the filling valve and the inlet/outlet opening—to realise a to and fro movement of the actuator. This on the one hand is the result of the surface area difference between the piston surfaces and on the other hand the throttle between the two volumes.

The inlet/outlet opening can be designed relatively large, in order to effect the rapid pressure drop in the first volume.

In embodiments, the piston closure element is also arranged for separating a working medium filling conduit with respect to the first volume. Herewith, high pressure impacts in the filling conduit can be avoided.

In embodiments, the two volumes are realised as parts of a common working space of a cylinder, in which a single piston is arranged, on which piston the two piston surfaces are formed.

Herewith, the sealing of the pistons with respect to the (now common) cylinder is not critical. Even a gap can be present between the piston and the cylinder. This has the function of the throttle between the two volumes. The pressure compensation therefore takes place through this gap. Herewith, a further simplification of the design is possible. The throttle in this embodiment is therefore formed by the gap between the cylinder and the piston. Herein, one makes do without the otherwise usual sealing of the piston.

In other embodiments, the two volumes and piston surfaces bear on separate pistons in separate cylinders, and the two separate pistons are mechanically coupled and herein their movements are also coupled.

End of Pulled Forward Part

In embodiments, the first piston surface and a piston closure element are designed for closing the inlet/outlet opening on the same piston. Herewith, a particularly simple and reliable design is possible.

In embodiments, the pneumatic actuator comprises a cylinder discharge valve for the rapid discharge of the working medium out of the first volume by way of opening the inlet/outlet opening. The cylinder discharge valve comprises a piston surface, on which a force for closing the cylinder discharge valve arises on subjection to the working medium, and a valve surface, on which a force in the opening direction of the cylinder discharge valve arises on subjection to the working medium, wherein the valve surface is smaller than the piston surface. Herewith, by way of the two surfaces being subjected to the same pressure, the cylinder discharge valve can be brought into the closed position and held there.

In embodiments, the pneumatic actuator comprises a discharge pilot valve for discharging working medium out of the discharge valve volume, in which the working medium acts upon the piston surface. Herewith, a brief temporary non-equilibrium of the pressure can be generated on the two surfaces, by which means the cylinder discharge valve is opened.

In embodiments, a working medium filling conduit for filling the discharge valve volume as well as the first volume with working medium at the same pressure is provided. Herewith, on the one hand the same pressure can be achieved in the two volumes and on the other hand the temporary non-equilibrium can be realised by way of the filling conduit between the two volumes acting as a throttle.

The pressure in the working medium is for example between 50 bar and 100 bar.

In embodiments, a section of the working medium filling conduit, through which section the first volume is supplied with working medium, runs through the cylinder discharge valve, in particular a shut-off body of the valve. For example, this section is a passage in the shut-off body which also permits a small throughflow through the valve in the closed position of the valve.

In embodiments, a section of the working medium filling conduit, through which section the first volume is supplied with the working medium, runs through a housing of the pressure wave generator.

In embodiments, a linear guidance of the piston is formed by way of the piston encompassing a rear closure guide and being linearly movable in a movement direction along the rear closure guide, and a hollow-cylindrical piston connection element which extends in the movement direction away from the piston encompassing a bearing element which is fastened to the rear closure guide. Herein, the second volume is formed between the piston, an inner side of the piston connection element, the bearing element and the rear closure guide. Typically, the rear closure guide is fixedly connected to the housing.

Herewith, as an extension of the hollow-cylindrical piston connection element, a hollow-cylindrical element can be driven, which is advantageous in certain applications. This is the case for example with the subsequently described pressure wave generator with a hollow-cylindrical closure element.

A pressure wave generator comprises: a main explosion chamber, a closure element which in a closure position closes the main explosion chamber with respect to the outlet and in an opening position permits a flow of explosion gases out of the main explosion chamber into the outlet, and an ignition means for igniting an explosion in the main explosion chamber. Herein, the pressure wave generator comprises a pneumatic actuator, in particular as described above, with which the closure element can be brought from the closure position into the opening position and in particular can also be brought from the opening position into the closure position. Herewith, a pressure wave generator which can repeatedly generate explosions and corresponding pressure waves is realised.

In embodiments, the pressure wave generator comprises a control which is designed to activate an opening movement of the closure element when a pressure in the main explosion chamber exceeds a predefined threshold value. Herewith, the opening of the main explosion chamber can be automatically adapted to changing conditions with the explosion, such conditions affecting the speed of the propagation of the explosion. If the time duration between the ignition and the maximum explosion pressure is known, the opening of the main explosion chamber can also be effected after a fixed opening delay time. In this case, one can forego the pressure measurement. The application is provided for conditions, in which the explosion propagates relatively slowly, thus the opening movement can begin after the ignition.

In embodiments, the ignition means is an ignition means which can be constantly supplied with energy, in particular a glow plug. Hence the ignition of the explosion in the main explosion chamber is effected by way of this ignition means or the glow plug. Herewith, a spontaneous ignition of the gas mixture according to the pressure, temperature and the composition of the gas mixture is effected.

In embodiments therefore, the pressure wave generator comprises a control which is designed to actively ignite the explosion in the main explosion chamber, or which is designed to detect a point in time of a spontaneous ignition, and which is further designed, after the completion of a settable ignition delay time after the igniting, to activate an opening movement of the closure element.

In embodiments, the pressure wave generator comprises a control which is designed to activate an opening movement of the closure element and, after the completion of a settable ignition delay time after the activating of the opening movement, to ignite the explosion in the main explosion chamber. The application is envisaged for conditions, in which the explosion propagates relatively quickly, thus the opening movement is to begin already before the ignition. In this case, the igniting of the explosion in the main explosion chamber can be effected by way of a spark plug.

In embodiments, an ignition time, i.e. a time duration between the ignition and reaching the maximal pressure in the main explosion chamber lies in the range of 30 ms to 150 ms.

In embodiments, a time duration between the activating of the opening movement of the closure element, for example by way of actuating a discharge magnet valve, and the maximum opening of the closure element lies in the region of 20 ms to 60 ms.

A method for operating a pressure wave generator with a main explosion chamber is effected amid the use of a pneumatic actuator which comprises:
- a first piston surface which acts counter to a gaseous working medium in a first volume, wherein a pressure in the first volume effects an actuator force in the first direction upon the first piston surface;
- a second piston surface which acts counter to the working medium in a second volume, wherein a pressure in the second volume effects an actuator force in a second direction which is opposite to the first direction, upon the second piston surface.

The method comprises the repeated execution of the following steps:
- a) filling the first volume with a gaseous working medium which is under pressure, in particular by way of a filling valve, for example a pressurised air valve;
- b) pressure compensation between the first volume and the second volume through a throttle and by way of this, on account of the surface area difference of the first piston surface and the second piston surface, moving the actuator in the first direction and by way of this moving the closure element in a closure direction and closing the main explosion chamber;
- c) filling the main explosion chamber with an explosive mixture;
- d) igniting an explosion in the main explosion chamber, and discharging at least a part of the working medium out of the first volume, in particular by way of opening an inlet/outlet opening of the first volume, and by way of this opening the main explosion chamber;
- e) by way of a more rapid pressure drop in the first volume than in the second volume, moving the actuator in the second direction and, by way of this moving a closure element in the opening direction for opening the main explosion chamber with respect to an outlet, and discharging explosion gases through the outlet out of the main explosion chamber.

The steps a), b) and c) can be carried out simultaneously or in a temporally overlapping manner. Step d) is typically carried out after the steps a), b) and c). With step d), the opening of the main explosion chamber, activated by the opening of the inlet/outlet opening, directly merges into step e).

In embodiments, the ignition of the explosion in the main explosion chamber is carried out before the opening of the main explosion chamber, and for opening the main explosion chamber, a pressure in the main explosion chamber is measured and the opening of the main explosion chamber is activated as soon as the pressure exceeds a predefined threshold value.

In embodiments, the igniting of the explosion in the main explosion chamber is carried out after the opening of the main explosion chamber, and the opening of the main explosion chamber is firstly activated, and the explosion in the main explosion chamber is ignited after completion of a predefined ignition delay time.

According to a second aspect of the invention, a pressure wave generator with the features of patent claim 22 is present.

The pressure wave generator thus comprises a main explosion chamber and an auxiliary explosion chamber, as well as
- a closure element which in a closure position closes the main explosion chamber with respect to an outlet, and in an opening position permits a flow of explosion gases out of the main explosion chamber into the outlet,
- and an ignition conduit for leading an explosion from the auxiliary explosion chamber into the main explosion chamber,
- wherein an ignition conduit valve is arranged in the ignition conduit.

The ignition conduit valve hence serves for interrupting or releasing the conduit to the explosion from the auxiliary explosion chamber into the main explosion chamber.

Herewith, the point in time, at which the explosion in the main explosion chamber is activated can be controlled. In particular, by way of this, the transmission of the explosion into the main explosion chamber can be delayed. By way of this, the ignition conduit can in turn be designed in a comparatively short manner, and by way of this, in turn one can eliminate the problem of a long ignition conduit only filling with one gas—thus not an explosive mixture. Even with a 10 cm long ignition conduit, this problem can lead to the explosion not firstly propagating through the ignition conduit, but only after the enclosed gas has been expelled out of the ignition conduit.

In embodiments, the ignition conduit valve is an electrically activated valve. An electrically activated valve can be activated by way of an electromagnet (magnet valve). The valve can be electrically activated in a direct manner, or indirectly via a pneumatic pilot valve.

Herewith—within certain limits—a free selection of the point in time of the explosion in the main explosion chamber is possible. The ignition conduit valve determines the point in time of the explosion, and the ignition conduit transmits the explosion and provides the energy for the igniting in the main explosion chamber In embodiments, the ignition conduit valve is mechanically actuatable by way of a movement of the closure element. The ignition conduit valve is a mechanically activated valve. "Actuatable" means that the movement of the closure elements effects an opening and/or closing of the ignition conduit valve. Herewith, a delay of the ignition in the main explosion chamber can be effected with simple means.

Moreover, one can ensure that the opening of the ignition conduit valve is positively coupled to the opening of the closure element, so that the main explosion can only be activated when the closure element is already opened. This is an aspect which is relevant to safety: were there to exist no such positive dependency of the ignition in the main explosion chamber on the opening of the closure element, then an error in the control could lead to the main explosion being activated without the closure element being opened. This in turn would create much higher demands on the pressure strength of the main explosion chamber.

In embodiments, an element of the ignition conduit valve is formed by a part of the closure element or is fixedly connected to the closure element. Herewith, a mechanical realisation of the ignition conduit valve is rendered possible, this realisation having few additional moved parts and therefore being less prone to malfunctioning.

In embodiments, the closure element comprises an opening which acts as an ignition conduit or is part of the ignition conduit, and the opening is releasable by way of a movement of the closure element from the closure position into the opening position. Herewith, a particularly simple realisation of the ignition conduit valve is possible.

This opening or recess thus also acts as part of the ignition conduit valve, in particular of a slider valve. The opening or recess can form a passage through a wall of the closure element between the main explosion chamber and the auxiliary explosion chamber. It can alternatively or additionally form a recess on a surface of a wall of the closure element, said recess forming a connection between the main explosion chamber and the auxiliary explosion chamber given an opening movement of the closure element.

In embodiments, the closure element can be brought from the closure position into the opening position by way of an explosion in the auxiliary explosion chamber. Herewith, a synchronisation of the movement of the closure element with the explosion in the main explosion chamber is possible with simple means, i.e. by way of the ignition conduit and the ignition conduit valve.

In embodiments, the pressure wave generator comprises: a spark-generating ignition means, in particular a spark plug, for triggering the explosion in the auxiliary explosion chamber, and a second filling conduit for filling the auxiliary explosion chamber, wherein the second filling conduit is not identical to the ignition conduit. Herewith, the auxiliary explosion chamber can be filled without a direct connection to the main explosion chamber existing during the filling, in particular whilst the ignition conduit valve is closed.

The spark-generating ignition means is intermittently supplied with (electrical) energy and by way of this produces a spark, in particular for igniting a gas mixture.

The spark-generating ignition means is not supplied with energy during the filling of the auxiliary explosion chamber, but is not until after the filling is it supplied with energy, in order to activate the auxiliary explosion.

In a method for operating a pressure wave generator with a main explosion chamber and an auxiliary explosion chamber, in particular according to the second aspect of the invention, the flowing steps can be carried out:
filling the main explosion chamber and the auxiliary explosion chamber each with an explosive mixture;
igniting an explosion in the auxiliary explosion chamber, in particular with a spark-generating ignition means;
leading the explosion from the auxiliary explosion chamber through an ignition conduit, wherein this leading is interrupted by an ignition conduit valve;
opening the main explosion chamber with respect to an outlet by way of opening a closure element;
opening the ignition conduit valve and by way of this leading the explosion into the main explosion chamber and igniting an explosion in the main explosion chamber; and
discharging explosion gases through the outlet out of the main explosion chamber.

In embodiments, the pressure wave generator comprises: an ignition means which can be constantly supplied with energy after the filling, in particular a glow plug, for triggering the explosion in the auxiliary explosion chamber, wherein the ignition conduit is arranged for filling the auxiliary explosion chamber from the main explosion chamber. "Can be constantly supplied with energy" is to be understood in that the ignition means cannot be supplied with energy only in an impulse-wise manner—as a spark plug—but in a continuous manner and can be heated during a supply time for example of several seconds or minutes or longer. By way of this, it can be heated and remain at an operating temperature. For example, the supply time or the heating time can be at least five or at least ten seconds or at least thirty seconds or at least one minute.

The ignition means can be supplied with energy after the filling of the main explosion chamber and by way of this can be brought to a high operating temperature, typically above 800° C. or around 1000° C. or up to 1300° C., wherein it is still in contact with the explosive mixture. Only on opening the ignition conduit does the explosive gas mixture flow from the main explosion chamber through the ignition conduit into the auxiliary explosion chamber and is ignited on contact with the glow plug. The auxiliary explosion chamber can herein be designed in a relatively small manner. In particular it can comprise only a short pipe section, in which a glow element of the glow plug is arranged.

In another method for the operation of a pressure wave generator with a main explosion chamber and with an auxiliary explosion chamber, according to the second aspect of the invention, the following steps can be carried out:
filling the main explosion chamber with an explosive mixture;
moving a closure element in an opening direction,
opening an ignition conduit valve, in particular by way of moving the closure element and by way of this leading the explosive mixture from the main explosion chamber into the auxiliary explosion chamber, wherein the auxiliary explosion chamber can only comprise a space, in which a heated element of an ignition means is arranged;
igniting an explosion in the auxiliary explosion chamber, in particular with an ignition means which can be constantly supplied with energy;
leading the explosion from the auxiliary explosion chamber through the ignition conduit into the main explosion chamber;
moving the closure element further in the opening direction for opening the main explosion chamber with respect to an outlet by way of opening a closure element, and discharging explosion gases through the outlet out of the main explosion chamber.

In embodiments, the closure element can be brought from the closure position into the opening position by its own actuator, in particular a pneumatic actuator. Herewith, an independent activation of the main explosion and of the opening movement of the closure element can be realised.

And with this too, by way of the auxiliary explosion only being used for igniting the main explosion with a high energy, and not for driving the closure element, a sealing of the auxiliary explosion chamber can be designed in a comparatively simple manner.

Common to the described devices and methods is the fact that by way of the ignition conduit—be it by way of the explosion in the auxiliary explosion chamber, activated by the spark plug or by the glow plug—the explosion in the main explosion chamber can be activated by such a high energy which immediately leads to a rapid explosion or detonation in the main explosion chamber. An ignition in the main explosion chamber by way of a spark plug would—depending on the gas mixture—lead to a firstly slow explosion.

Herewith, it is again possible to use relatively weakly explosive gas mixtures. For example, a fluid gas such as propane gas can be used. This is safer in its handling and is subjected to less strict regulatory stipulations than for example natural gas or ethane.

The pneumatic actuator according to the first aspect of the invention can be used with a pressure wave generator with only one main explosion chamber, or with a pressure wave generator according to the second aspect, with a main explosion chamber and an auxiliary explosion chamber, or in other applications.

In embodiments, the closure element is movable in a movement direction, and at least one plane exists, said plane being orthogonal to the movement direction and intersecting the auxiliary explosion chamber as well as the main explosion chamber. Herewith, a good sealing can be realised between the main explosion chamber and the auxiliary explosion chamber. A compact construction of the device can also be realised. Herewith, a closure element with a comparatively small mass can also possibly be realised.

The aforedescribed arrangement of the main explosion chamber with respect to the auxiliary explosion chamber, in embodiments can also be realised without an ignition conduit and without an ignition conduit valve. According to a third aspect of the invention, a pressure wave generator with the following features is therefore present:

Pressure wave generator, with a main explosion chamber and with an auxiliary explosion chamber,
  a closure element which in a closure position closes the main explosion chamber with respect to an outlet and in an opening position permits a flowing of explosion gases out of the main explosion chamber into the outlet,
  wherein the closure element can be brought from the closure position into the opening position by way of an explosion in the auxiliary explosion chamber,
  wherein the closure element can be moved in a movement direction, and at least one plane exists, said plane being orthogonal to the movement direction and intersecting the auxiliary explosion chamber as well as the main explosion chamber.

In embodiments, considered in this at least one plane, the auxiliary explosion chamber is separated from the main explosion chamber by way of the closure element. Herewith, a particularly simple design and a good sealing between the two explosion chambers can be realised. Furthermore, the arrangement of an ignition conduit through the closure element is possible herewith, and the function of the closure element as part of a slider valve.

In embodiments, the single connection, through which the explosion can propagate from the auxiliary explosion chamber into the main explosion chamber leads through the gas spring. This means that the gas or working medium of the gas spring stops a propagation of the explosion.

One or more main explosion chambers which are separate from one another and one or more auxiliary explosion chambers which are separate from one another can be present. A main explosion chamber can be assigned to several auxiliary explosion chambers, or vice versa, or a main explosion chamber can be assigned to precisely one auxiliary explosion chamber.

In embodiments, the main explosion chamber and the auxiliary explosion chamber are arranged concentrically to one another.

Herein, the main explosion chamber as well as the auxiliary explosion chamber can be designed in an annular or torus-shaped manner. In particular, the main explosion chamber at least in a section which extends in the movement direction of the closure element can encompass the auxiliary explosion chamber.

In embodiments, the main explosion chamber and the auxiliary explosion chamber are arranged symmetrically with respect to the movement direction.

In embodiments, the main explosion chamber and the auxiliary explosion chamber are arranged rotationally symmetrically with respect to the movement direction.

Herein, the main explosion chamber and the auxiliary explosion chamber, as a single chamber or as several chambers can be present at least in sectors considered along the circumference of the pressure wave generator.

Further preferred embodiments are to be derived from the dependent claims. Herein, the features of the method claims, where appropriate, can be combined with the device claims and vice versa.

Figure 2:
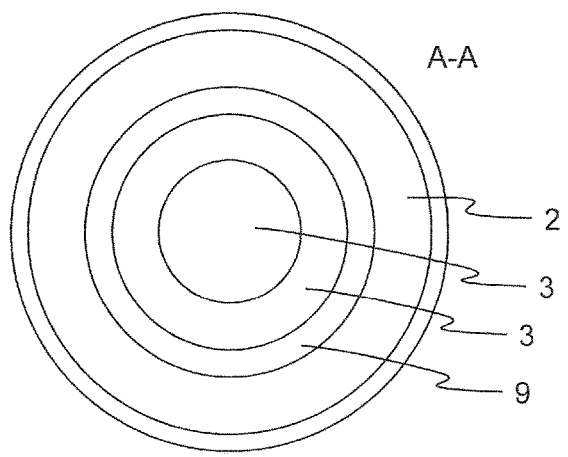

The subject-matter of the invention is hereinafter explained in more detail by way of preferred embodiments which are represented in the accompanying drawings. Shown schematically:

FIG. 1 a longitudinal section through a pressure wave generator;

FIG. 2 a cross section through the pressure wave generator;

FIG. 3 a longitudinal section through another embodiment;

FIG. 4 a section of the longitudinal section for a further embodiment; and

Figure 5:
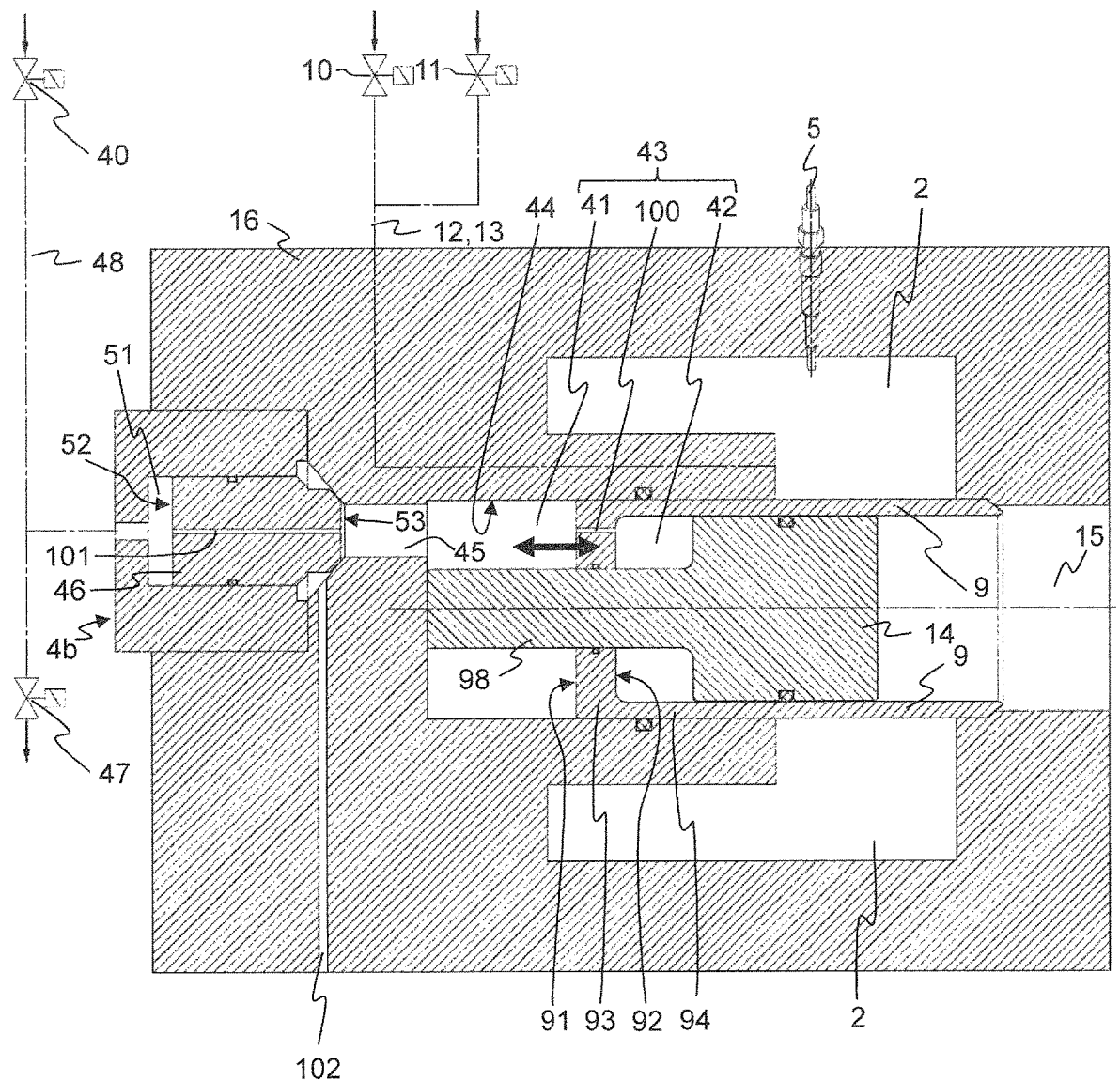

FIG. 5 a longitudinal section through a further embodiment.

Basically in the figures, the same parts are provided with the same reference numerals.

FIGS. 1 and 2 show a pressure wave generator 1 with a main explosion chamber 2 and with an auxiliary explosion chamber 3. A closure element 9 is arranged for closing the main explosion chamber 2 with respect to an outlet 15. The closure element 9 is driven by an explosion in the auxiliary explosion chamber 3, in order to open the main explosion chamber 2 with respect to the outlet 15. A gas spring 4 is arranged for braking this opening movement of the closure element 9. The basic manner of functioning of such a pressure wave generator 1 is explained in the initially cited WO 2007/028264 and WO 2010/025574.

The closure element 9 is guided on a bearing element 14 which permits a linear opening and closing movement of the closure element 9. The closure element 9 is shaped in a hollow-cylindrical manner and surrounds the bearing element 14 which is fixedly connected to a housing 16. The movement direction, represented by a double arrow, is typically equal to a longitudinal direction of the pressure wave generator 1, and also equal to an outflow direction, in which the explosion gases flow out of the outlet 15. FIG. 1 shows the closure element 9 in a closed position, i.e. the main explosion chamber 2 is closed with respect to the outlet 15.

The outlet 15 serves for the directed discharge or leading-away of the explosion gases. A pressure wave can be produced herewith.

A first filling conduit 12 is arranged for filling the main explosion chamber 2 and a second filling conduit 13 for filling the auxiliary explosion chamber 3. The second filling conduit 13 is led through the bearing element 14 to the auxiliary explosion chamber 3. The two filling conduits, as shown, can be commonly fed through a fuel valve 10 or an oxidator valve 11. Alternatively, each of the filling conduits and explosion chambers can be fed by an individual fuel valve or oxidator valve and thus be fed independently of other filling conduit and explosion chamber respectively.

The two explosion chambers can be filled separately from one another. For example, herein a combustion gas can firstly be filled in at a comparatively low pressure, for example 2 bar, and subsequently an oxidator, for example air, at a high pressure, for example 20 bar.

A spark plug 5 for igniting the auxiliary explosion chamber 3 is arranged in the bearing element 14. For this, according to the embodiment of FIG. 1, the spark plug 5 is arranged centrally in the region of a symmetry axis (typically in the direction of the longitudinal axis of the device), and can be connected to the auxiliary explosion chamber 3 through a connection opening 6.

For igniting the explosion in the main explosion chamber 2 with a delay with respect to the explosion in the auxiliary explosion chamber 3, an ignition conduit 8 is present. Two variants of ignition conduits 8 are drawn in FIG. 1, wherein in a realisation of a pressure wave generator 1, as a rule only one is present.

- The ignition conduit 8 can be realised as an opening in the closure element 9, said opening being released given the opening movement of the closure element 9. This can be effected by way of an interaction of the closure element 9 with another part of the pressure wave generator 1. Here, this by way of example is the bearing element 14, wherein this with the closure element 9 forms a slider valve 71 as an ignition conduit valve 7: the slider valve 71 opens by way of the closure element 9 being moved along the bearing element 14.
- The ignition conduit can be realised as a conduit 8' (represented dashed) with an ignition conduit valve 7 which is arranged thereon. This can be magnet valve 72 or generally an electrically activated valve.

According to embodiments (not represented) the ignition conduit valve 7 is mechanically actuated given the opening movement of the closure element 9. For this, a mechanical transmission device can be present. This can be adjustable so that the opening of the ignition conduit valve 7—depending on the setting—takes place at different positions of the closure element 9. Herein, the opening of the ignition conduit valve 7 can be positively coupled to the opening of the closure element 9, so that the main explosion is only activated when the closure element 9 is already opened.

By way of the presence of the ignition conduit valve 7, the point in time of the transmission of the explosion from the auxiliary explosion chamber 3 into the main explosion chamber 2 can be controlled.

FIG. 2 shows a concentric arrangement of the main explosion chamber 2 which—at least in a section which extends in the movement direction of the closure element 9—surrounds the auxiliary explosion chamber 3 in the radial direction and is separated from it by the closure element 9.

The closure element 9 surrounds the bearing element 14, wherein the auxiliary explosion chamber 3 is formed between the closure element 9 and the bearing element 14. On displacing the closure element 9 along the movement direction, the volume of the auxiliary explosion chamber 3 changes. A volume of the gas spring 4 which likewise changes by way of this displacement is formed between the closure element 9 and the housing 16. The gas spring 4 also acts as a block against the propagation of an explosion from the auxiliary explosion chamber 3 into the main explosion chamber 2.

FIG. 3 shows a pressure wave generator 1 according to another embodiment. The manner of functioning of the elements: main explosion chamber 2, closure element 9, ignition conduit valve 7 or slider valve 71, ignition conduit 8 and outlet 15 is essentially the same as with the embodiment of FIG. 1.

The auxiliary explosion chamber 3 however is not arranged for driving the closure element 9 but only for generating the auxiliary explosion. The energy of the auxiliary explosion triggers the ignition of the explosion in the main explosion chamber 2 after the release of the slider valve 71 by way of the opening movement of the closure element 9.

The opening movement of the closure element 9 is effected by way of an active gas spring or pneumatic actuator 4b. This comprises a cylindrical working space 43 with a piston 93 which is moved therein and whose movement is coupled to the movement of the closure element 9, in particular by way of them being fixedly connected to one another, in particular in a single-part manner. In the embodiments of FIGS. 3 and 5, the coupling is effected by way of a piston connection element 94. This is a piston rod in FIG. 3, and a hollow cylinder in FIG. 5.

The piston 93 divides the working space 43 into a first volume 41 and into a second volume 42. No seal is present between a cylinder inner wall 44 of the working space 43 and the piston 93. In particular, a small gap can also be present, hereinafter called piston gap 96. This permits a gas exchange between the two volumes and herein in particular acts as a throttle. In other embodiments, a separate conduit can be arranged between the first volume 41 and the second volume 42, and can comprise a throttle which permits the gas exchange additionally or alternatively to the piston gap 96. Such a throttle as a piston throttle 10 can also be realised by one or more bores through the piston 93, which likewise permits a gas exchange between the two volumes.

A gas pressure of the working medium in the first volume 41 effects a force counter to the direction of the opening movement of the closure element 9, wherein a surface [area] which is herein effective is a first piston surface 91.

A gas pressure of the working medium in the second volume 42 effects a force in the direction of the opening movement of the closure element 9, wherein a surface area which is herein effective is a second piston surface 92.

Herein, the second piston surface 92 is smaller than the first piston surface 91 for example at least five or ten or twenty percent smaller.

The piston 93 comprises a piston closure element 95 which in the course of the opening movement closes a cylinder inlet/outlet 45 or inlet/outlet opening of the first volume 41. The cylinder inlet/outlet 45 here is drawn concentrically to the working space 43, but alternatively could also be arranged laterally.

A braking or an end-position damping of the opening movement is effected by way of the closing of the cylinder inlet/outlet. At the same time, the pressurised air valve 49 is also protected from a pressure impact through the pressurised air filling conduit 48.

The cylinder inlet/outlet 45 can be opened by a cylinder discharge valve 46. The working medium flows for example through a discharge or vent conduit 102. The cylinder discharge valve 46 can have a relatively large valve cross section, compared to a filling conduit. Herewith, an abrupt pressure reduction in the first volume 41 can be realised. The cylinder discharge valve 46 is held closed by a pressure in a pressurised air filling conduit 48. This pressure can be reduced by way of opening the discharge pilot valve 47. The opening movement of the closure element is therefore activated by the opening of the discharge pilot valve.

The cylinder discharge valve 46 by way of example is a seat valve with a movable shut-off body. The shut-off body comprises a piston surface 52, on which it is impinged by the pressurised air from the pressurised air filling conduit 48 in a discharge valve volume 51. A valve surface 53 which is subjected to the pressure in the cylinder inlet/outlet 45 is smaller than the piston surface 52. The forces upon the piston surface 52 and the valve surface 53 are opposite to one another. If the discharge pilot valve 47 is closed, then the gas pressure at the two surfaces is the same, and the force upon the piston surface 52 is greater than that upon the valve surface 53, by which means the shut-off body or the cylinder discharge valve 46 is held in the closed position.

The pressurised air filling conduit 48, via a section 101 of the pressurised air filling conduit 48 also feeds the first volume 41. The pressurised air filling conduit 48 in turn is fed via a pressurised air valve 49.

A venting conduit 97 effects a pressure compensation between the ambient air and an intermediate cylinder. The intermediate cylinder lies between a rear end of the closure element 9 and the active gas spring or the pneumatic actuator 4b.

In the variant of the embodiment of FIG. 3, the working space 43 and the piston 93 are realised in a compact manner. The same manner of functioning however can also be realised with separate first and second volumes and with separate pistons with different piston surface areas. Herein, a conduit with a throttle is arranged between the two volumes and the movements of the two pistons are mechanically coupled. This means that a linear movement of one of the two pistons always also causes a linear movement of the other piston.

In the embodiments of FIG. 3 and also of the other figures, a piston path can be for example between 20 mm and 150 mm, in particular between 30 mm and 80 mm. A diameter of the piston can be for example between 20 mm and 200 mm, in particular between 40 mm and 120 mm.

FIG. 3 shows the pneumatic actuator 4b in combination with a pressure wave generator 1. The pneumatic actuator 4b however can also be used in other applications. For this, the piston rod 94 can be coupled to another element, or the movement of the piston rod can be coupled to the movement of another element.

FIG. 4 shows a detail of a pressure wave generator 1 according to another embodiment, a variant of the embodiment of FIG. 3. The manner of functioning of the elements: main explosion chamber 2, closure element 9, ignition conduit valve 7 or slider valve 71, ignition conduit 8, outlet 15 and of the pneumatic actuator 4b is essentially the same as with the embodiment of FIG. 3.

In this variant, the auxiliary explosion chamber 3 has no individual filling conduit 13. It is designed in a comparatively small manner. Instead of a spark plug 5, it comprises a glow plug. On operation of the pressure wave generator 1, this is not only supplied at an ignition point in time, but can be supplied in a constant manner, i.e. it can glow permanently or over a longer time, e.g. several seconds or minutes. Herewith, it can have a high temperature, and herewith again can introduce sufficient energy into the gas mixture, in order to trigger a rapidly propagating explosion or detonation in the main explosion chamber 2. Depending on the gas mixture and pressure, this would not be possible with a spark plug, but it would firstly only activate a combustion which only after a certain time (for example 30-50 ms) leads to an explosion. The ignition in the main explosion chamber 2 is effected by way of the glow plug being supplied with energy after the filling of the main explosion chamber 2 and being brought up to its operating temperature. This can last a few seconds, for example five or ten seconds. If then the slider valve 71 releases the ignition conduit 8 by way of the opening movement of the closure element 9, the explosive gas mixture flows from the main explosion chamber 2 into the auxiliary explosion chamber 3 and comes into contact with the heated glow plug. This triggers the explosion in the auxiliary explosion chamber 3 and through the ignition conduit 8 also in the main explosion chamber 2. The opening movement of the closure element 9 is effected by way of the pneumatic actuator 4b as has already been described above.

On operation of this variant, the following methods steps can be carried out:

Opening the pressurised air valve 49 given a closed discharge pilot valve 47. This has the following effects: the pressure in the pressurised air filling conduit 48 (e.g. 70 bar) closes the cylinder discharge valve 46. The first volume 41 is subjected to or impinged by pressurised air through the pressurised air filling conduit 48. The second volume 42 is also subjected through the piston gap 96, wherein with time the same pressure is present in both volumes. Since the first piston surface 91 is larger than the second piston surface 92, the piston 93 and hence the closure element 9 is moved into a closed position (counter to the direction of the opening movement).

Closing the pressurised air valve 49. The closure element 9 remains in the closed position.

Opening the fuel valve 10 and the oxidator valve 11 and by way of this filling the main explosion chamber 2 and, depending on the embodiment, also the auxiliary explosion chamber 3. Herein, the fuel valve 10 can firstly be opened given a closed oxidator valve 11, and a controlled quantity of fuel can be introduced at a first pressure. Then, given a closed fuel valve 10, the oxidator valve 11 can be opened and a quantity of oxidator can be introduced up to a higher second pressure. The quantity share of oxidator and fuel can be adjusted by way of the ratio of the first and second pressure. Typically, the quantity share is selected as a stoichiometric ratio in accordance with the chemical reaction on combustion or explosion. For example, propane can be used as fuel and air as an oxidator, in a quantity ratio or pressure ratio of 1:15 to 1:24.

One of the following two method variants (more concerning this further below):

Either: triggering the auxiliary explosion in the auxiliary explosion chamber 3 by way of activating the spark plug 5, subsequent activating the opening movement and, by way of opening the ignition conduit valve 7, triggering the explosion in the main explosion chamber 2.

Or: activating the opening movement and by way of this subsequent triggering of the explosion in the main explosion chamber 2 by way of combustion gas getting through the ignition conduit valve 7 to the glow plug.

In both cases, the activating of the opening movement is effected by way of opening the cylinder discharge valve 46, which in particular can be effected by way of opening the discharge pilot valve 47 and the reduction of the pressure in the pressurised air filling conduit 48. The pressure in the first volume 41 drops by way of the opening of the cylinder discharge valve 46. The pressure in the second volume 42 likewise drops, but on account of the throttle effect of the piston gap 96 drops more slowly than in the first volume 41. By way of this, in turn the force upon the second piston surface 82 is larger than the force upon the first piston surface 91. This effects a movement of the piston 93 and thus the opening movement of the closure element 9.

Before the piston 93 or the closure element 9 hit a stop, the piston closure element 95 closes the cylinder inlet/outlet 45. The air which remains in the (now smaller) first volume 41 is compressed and brakes the movement of the piston 93 and of the closure element 9. One prevents the pressurised air valve 49 from being loaded by a pressure peak.

The explosion gases flow out of the opening which has been released by the closure element 9.

Closing the cylinder discharge valve 46, in particular by way of closing the discharge pilot valve 47. This can be effected by way of a piston surface, via which the pressurised air in the pressurised air filling conduit 48 presses the cylinder discharge valve 46 or its shut-off body into the closed position, being larger than a surface, on which the pressurised air acts in the opposite direction upon the cylinder discharge valve 46 or its shut-off body. After the closing of the cylinder shut-off valve 46, the pressure in the first volume 41 can still be adequately high (e.g. 20 bar), in order to also move back the piston 93 after a pressure compensation with the second volume 42 and to herewith bring the closure element 9 into the closed position.

Subsequently, the method can be begun again with the opening of the pressurised air valve 49.

The aforedescribed method variants are variants of the device with a spark plug or glow plug. The differences lie in the fact that in the variant with the spark plug, the ignition in the auxiliary explosion chamber 3 is effected before the activating of the opening movement, e.g. 50 ms beforehand. In this time, an explosion with sufficient energy has developed in the auxiliary explosion chamber 3, in order in the course of the opening of the ignition conduit valve 7 or slider valve 71 by way of the opening movement to trigger the necessary rapid explosion in the main explosion chamber 2.

In the variant with the glow plug, this can already bring in sufficient energy for the rapid explosion in the main explosion chamber 2, if on opening the ignition conduit valve 7 or slider valve 71 the gas mixture flows to the glow plug.

In both variants, thanks to the introduced ignition energy, it only lasts e.g. about two ms until the explosion has propagated in the main explosion chamber 2. An explosion pressure builds up in the main explosion chamber 2 whilst the opening movement already takes place. A maximal energy in the gas flow arises in the outlet 15 when the explosion pressure is maximal at the point in time when the opening of the closure element 9 between the main explosion chamber 2 and the outlet 15 is also maximal.

In other embodiments, the spark plug 5 or the glow plug 5b is arranged for igniting gas mixture or for triggering the explosion in the main explosion chamber 2. In these embodiments, in particular there is no auxiliary explosion chamber 3 and no ignition conduit 8. The igniting of the explosion in the main explosion chamber 2 is synchronised with the moving of the closure element in the opening direction by way of a control 20. Herein, depending on the speed at which the explosion propagates in the main explosion chamber 2 and at which the pressure in the main explosion chamber 2 builds up, the movement of the closure element 9 can be effected before or after the ignition in the main explosion chamber 2.

For example, the explosion in the main explosion chamber 2 can propagate relatively slowly. The opening under certain circumstances can then be effected not until after the ignition. In detail, herein the exemplary following steps are repeatedly carried out for operating the pressure wave generator (1) with a main explosion chamber (2):

filling the main explosion chamber (2) with an explosive mixture;

igniting an explosion in the main explosion chamber (2);

measuring a pressure in the main explosion chamber (2) and, as soon as a the pressure exceeds a predefined threshold value, activating an opening of the main explosion chamber (2), in particular by way of a pneumatic actuator, in particular the pneumatic actuator (4b) which is described here;

moving, by way of the pneumatic actuator (4b), a closure element (9) in an opening direction for opening the main explosion chamber (2) with respect to an outlet (15), and discharging explosion gases through the outlet (15) out of the main explosion chamber (2);

closing the main explosion chamber (2) by way of moving the closure element (9) in a closure direction by way of the pneumatic actuator (4b).

Alternatively, if the explosion propagates comparatively rapidly in the main explosion chamber 2, under certain circumstances the opening can already be activated before the ignition. In detail, the exemplary following steps are herein repeatedly carried out for operating the pressure wave generator (1) with a main explosion chamber (2):

filling the main explosion chamber (2) with an explosive mixture;

moving a closure element (9) in an opening direction, in particular by way of a pneumatic actuator, in particular the pneumatic actuator (4b) which is described here;

igniting, after completion of a predefined ignition delay time, an explosion in the main explosion chamber (2);

further moving the closure element (9) in the opening direction for opening the main explosion chamber (2) with respect to an outlet (15), and discharging explosion gases through the outlet (15) out of the main explosion chamber (2);

closing the main explosion chamber (2) by way of moving the closure element (9) in a closure direction by way of the pneumatic actuator (4b).

As to whether the explosion propagates comparatively slowly or quickly, amongst other things depends on the applied explosive (gas) mixture, its pressure and temperature and on the applied ignition means glow (plug or spark plug), etc.

On using the pneumatic actuator 4b, as described above, the moving of the closure element in the opening direction is effected by the movement of the pneumatic actuator in the second direction. The moving of the closure element in the closure direction is effected by way of the movement of the pneumatic actuator in the first direction.

FIG. 5 shows an embodiment with only one main explosion chamber 2, thus without an auxiliary explosion chamber 3 and without an ignition conduit 8. FIG. 5 also shows an alternative pneumatic actuator 4b which is different to that of FIG. 3. The complete pneumatic actuator which is shown in FIG. 5 or also only individual elements, for example a piston throttle 100 and/or a closure element 9 with a hollow cylinder instead of the piston rod as a piston connection element 94 and/or a cylinder discharge valve 46 with a section 101 of the pressurised air filling conduit can be combined with a pressure wave generator 1 with an auxiliary explosion chamber 3 such as for example according to FIG. 3.

The manner of functioning is basically the same as that of the embodiment of FIG. 3, with the following differences in the realisation of the individual elements:

The piston connection element 94 which connects the piston 93 to the closure element 9 is formed by a hollow cylinder. The piston 93 encompasses a rear closure guide 98 which can be designed as a general cylinder, in particular as a circular cylinder and is linearly movable along this in the movement direction. The piston connection element 94 surrounds the bearing element 14 which is fixedly connected to a housing 16. The second volume 42 lies between the rear closure guide, the piston 93 and the inner side of the hollow cylinder or of the piston connection element 94.

The throttle between the first volume 41 and the second volume 42 is realised as a piston throttle 100 by one or more bores through the piston 93. Additionally or alternatively however, the function of the piston throttle can also be assumed by a gap between the piston 93 and the rear closure guide 98.

The section 101 of the pressurised air filling conduit 48, through which the first volume 41 is supplied with the working medium does not run through the housing 16 but through the shut-off body of the cylinder discharge valve 46, for example as a bore, and can also be called a piston throttle of the cylinder discharge valve 46. Hence the first volume 41 is supplied with the working medium via the discharge valve volume 51.

One can make do without an end-position damping. If in the embodiment of FIG. 5 an end-position damping is to be realised, then this can be effected as in FIG. 3 by way of a projecting closure element 95 which moves into the cylinder inlet/outlet 45, or by way of the cylinder inlet/outlet 45 being led laterally into the first volume 41, and being closed by way of the piston 93 sliding over the cylinder inlet/outlet 45 given the opening movement.

The invention claimed is:

1. A pneumatic actuator comprising:
    a first piston surface which acts counter to a gaseous working medium in a first volume, wherein a pressure in the first volume effects an actuator force in a first direction upon the first piston surface;
    a second piston surface which acts counter to the gaseous working medium in a second volume, wherein a pressure in the second volume effects an actuator force in a second direction which is opposite to the first direction, upon the second piston surface;
    a throttle between the first volume and the second volume;
    an inlet/outlet opening of the first volume for bringing the gaseous working medium into and discharging it out of the first volume;
    wherein the first piston surface is larger than the second piston surface;
    wherein a filling valve is arranged for filling the first volume;
    wherein the pneumatic actuator is configured to perform a method having the following steps:
        filling the first volume with the gaseous working medium which is under pressure;
        pressure compensation between the first volume and the second volume through the throttle and, by way of this, on account of a surface area difference between the first piston surface and the second piston surface, moving the actuator in the first direction;
        discharging at least a part of the gaseous working medium out of the first volume;
        by way of a pressure drop in the first volume and in the second volume, wherein said pressure drop is more rapid in the first volume than in the second volume, moving the actuator in the second direction;
    wherein the filling of the first volume with a gaseous working medium which is under pressure is carried out by way of the filling valve.

2. The pneumatic actuator according to claim 1, comprising an end position damping for closing the inlet/outlet opening.

3. The pneumatic actuator according to claim 1, wherein a piston closure element is arranged for closing the inlet/outlet opening.

4. The pneumatic actuator according to claim 3, wherein the piston closure element is also arranged for separating a gaseous working medium filling conduit with respect to the first volume.

5. The pneumatic actuator according to claim 1, wherein the first piston surface and the second piston surface are formed on the same piston.

6. The pneumatic actuator according to claim 1, wherein the first piston surface and the second piston surface are formed on separate pistons, whose movements are mechanically coupled to one another.

7. The pneumatic actuator according to claim 1, wherein the first piston surface and a piston closure element for closing the inlet/outlet opening are formed on the same piston.

8. The pneumatic actuator according to claim 1, comprising a cylinder discharge valve for the rapid discharge of the gaseous working medium out of the first volume by way of opening the inlet/outlet opening, wherein the cylinder discharge valve comprises a piston surface, on which a force for closing the cylinder discharge valve arises on subjection to the gaseous working medium, and a valve surface on which a force in the opening direction of the cylinder discharge valve arises on subjection to the gaseous working medium, and wherein the valve surface is smaller than the piston surface.

9. The pneumatic actuator according to claim 8, comprising a discharge pilot valve for discharging gaseous working medium out of a discharge valve volume in which the gaseous working medium acts upon the piston surface.

10. The pneumatic actuator according to claim 8, wherein a gaseous working medium filling conduit is arranged for filling the discharge valve volume as well as the first volume with gaseous working medium at the same pressure.

11. The pneumatic actuator according to claim 10, wherein a section of the gaseous working medium filling conduit, through which section the first volume is supplied with gaseous working medium, runs through the cylinder discharge valve, in particular through a shut-off body of the valve.

12. The pneumatic actuator according to claim 1, wherein a linear guidance of the piston is formed by way of the piston encompassing a rear closure guide and being linearly movable in a movement direction along the rear closure guide, and a hollow-cylindrical piston connection element which extends in the movement direction away from the piston encompassing a bearing element which is fastened to the rear closure guide and wherein the second volume is formed between the piston, an inner side of the piston connection element, the bearing element and the rear closure guide.

13. A method for operating a pneumatic actuator which comprises:
   a first piston surface which acts counter to a gaseous working medium in a first volume, wherein a pressure in the first volume effects an actuator force in a first direction upon the first piston surface;
   a second piston surface which acts counter to the gaseous working medium in a second volume, wherein a pressure in the second volume effects an actuator force in a second direction which is opposite to the first direction, upon the second piston surface;
   with the following steps:
      filling the first volume with a gaseous working medium which is under pressure;
      pressure compensation between the first volume and the second volume through a throttle and, by way of this, on account of a surface area difference between the first piston surface and the second piston surface, moving the actuator in the first direction;
      discharging at least a part of the gaseous working medium out of the first volume;
      by way of a pressure drop in the first volume and in the second volume, wherein said pressure drop is more rapid in the first volume than in the second volume, moving the actuator in the second direction;
   wherein the filling of the first volume with a gaseous working medium which is under pressure is carried out by way of a filling valve.

14. The method of claim 13, wherein the filling valve is a pressurised air valve.

15. The method of claim 13, wherein the discharging of at least a part of the gaseous working medium out of the first volume is carried out by way of opening an inlet/outlet opening of the first volume.

16. A method for operating a pressure wave generator with a main explosion chamber, amid the use of a pneumatic actuator, which comprises:
   a first piston surface which acts counter to a gaseous working medium in a first volume, wherein a pressure in the first volume effects an actuator force in a first direction upon the first piston surface;
   a second piston surface which acts counter to the gaseous working medium in a second volume, wherein a pressure in the second volume effects an actuator force in a second direction which is opposite to the first direction, upon the second piston surface;
   comprising the repeated execution of the following steps:
      filling the first volume with a gaseous working medium which is under pressure, in particular by way of a filling valve, for example a pressurised air valve;
      pressure compensation between the first volume and the second volume through a throttle and by way of this, on account of the surface area difference of the first piston surface and the second piston surface, moving the actuator in the first direction and by way of this moving the closure element in a closure direction and closing the main explosion chamber;
      filling the main explosion chamber with an explosive mixture;
      igniting an explosion in the main explosion chamber, and discharging at least a part of the gaseous working medium out of the first volume, in particular by way of opening an inlet/outlet opening of the first volume, and by way of this opening the main explosion chamber;
      by way of a more rapid pressure drop in the first volume than in the second volume, moving the actuator in the second direction and, by way of this, moving a closure element in the opening direction for opening the main explosion chamber with respect to an outlet, and discharging explosion gases through the outlet out of the main explosion chamber;
   wherein the filling of the first volume with a gaseous working medium which is under pressure is carried out by way of a filling valve.

17. The method according to claim 16, wherein the igniting of the explosion in the main explosion chamber is carried out before the opening of the main explosion chamber and, herein
   for opening the main explosion chamber, a pressure in the main explosion chamber is measured and the opening of the main explosion chamber is activated as soon as the pressure exceeds a predefined threshold value.

18. The method according to claim 16, wherein the igniting of the explosion in the main explosion chamber is carried out after the opening of the main explosion chamber, and herein
   the opening of the main explosion chamber is firstly activated, and the explosion in the main explosion chamber is ignited after completion of a predefined ignition delay time.

19. A pneumatic actuator for performing the method of claim 16, comprising a first piston surface which acts counter to a gaseous working medium in a first volume, wherein a pressure in the first volume effects an actuator force in a first direction upon the first piston surface;
   a second piston surface which acts counter to the gaseous working medium in a second volume, wherein a pressure in the second volume effects an actuator force in a second direction which is opposite to the first direction, upon the second piston surface;
   a throttle between the first volume and the second volume;
   an inlet/outlet opening of the first volume for bringing the gaseous working medium into and discharging it out of the first volume;
   wherein the first piston surface is larger than the second piston surface;
   wherein a filling valve is arranged for filling the first volume.

20. The pneumatic actuator according to claim 19, comprising an end position damping for closing the inlet/outlet opening.

21. The pneumatic actuator according to claim 19, wherein a piston closure element is arranged for closing the inlet/outlet opening.

22. The pneumatic actuator according to claim 21, wherein the piston closure element is also arranged for separating a gaseous working medium filling conduit with respect to the first volume.

23. The pneumatic actuator according to claim 19, wherein the first piston surface and the second piston surface are formed on the same piston.

24. The pneumatic actuator according to claim 19, wherein the first piston surface and the second piston surface are formed on separate pistons, whose movements are mechanically coupled to one another.

25. The pneumatic actuator according to claim 19, wherein the first piston surface and a piston closure element for closing the inlet/outlet opening are formed on the same piston.

26. The pneumatic actuator according to claim 19, comprising a cylinder discharge valve for the rapid discharge of the gaseous working medium out of the first volume by way of opening the inlet/outlet opening, wherein the cylinder discharge valve comprises a piston surface, on which a force for closing the cylinder discharge valve arises on subjection to the gaseous working medium, and a valve surface on which a force in the opening direction of the cylinder discharge valve arises on subjection to the gaseous working medium, and wherein the valve surface is smaller than the piston surface.

27. The pneumatic actuator according to claim 26, comprising a discharge pilot valve for discharging gaseous working medium out of a discharge valve volume in which the gaseous working medium acts upon the piston surface.

28. The pneumatic actuator according to claim 26, wherein a gaseous working medium filling conduit is arranged for filling the discharge valve volume as well as the first volume with gaseous working medium at the same pressure.

29. The pneumatic actuator according to claim 28, wherein a section of the gaseous working medium filling conduit, through which section the first volume is supplied with gaseous working medium, runs through the cylinder discharge valve, in particular through a shut-off body of the valve.

30. The pneumatic actuator according to claim 19, wherein a linear guidance of the piston is formed by way of the piston encompassing a rear closure guide and being linearly movable in a movement direction along the rear closure guide, and a hollow-cylindrical piston connection element which extends in the movement direction away from the piston encompassing a bearing element which is fastened to the rear closure guide and wherein
the second volume is formed between the piston, an inner side of the piston connection element, the bearing element and the rear closure guide.

31. A pressure wave generator for operating the method of claim 16, with a main explosion chamber,
a closure element which in a closure position closes the main explosion chamber with respect to the outlet and in an opening position permits a flow of explosion gases out of the main explosion chamber into the outlet,
and an ignition means for igniting an explosion in the main explosion chamber,
wherein the pressure wave generator comprises a pneumatic actuator according to claim 1, and the closure element can be brought from the closure position into the open position and in particular can also be brought from the opening position into the closure position, by way of the pneumatic actuator.

32. The pressure wave generator according to claim 31, wherein the pressure wave generator comprises a control which is designed to activate an opening movement of the closure element when a pressure in the main explosion chamber exceeds a predefined threshold value.

33. The pressure wave generator according to claim 32, wherein the ignition means is an ignition means which can be constantly supplied with energy, in particular a glow plug.

34. The pressure wave generator according to claim 31, wherein the pressure wave generator comprises a control which is designed to activate an opening movement of the closure element and after the completion of a settable ignition delay time after the activating of the opening movement, to ignite the explosion in the main explosion chamber.

35. The pressure wave generator according to claim 34, wherein the ignitions means is a spark-generating ignition means, in particular a spark plug.

36. The pressure wave generator according to claim 31, with a main explosion chamber and additionally comprising an auxiliary explosion chamber,
and an ignition conduit for leading an explosion from the auxiliary explosion chamber into the main explosion chamber,
wherein an ignition conduit valve is arranged in the ignition conduit.

37. The pressure wave generator according to claim 36, wherein the ignition conduit valve is an electrically activated valve.

38. The pressure wave generator according to claim 36, wherein the ignition conduit valve is mechanically actuatable by way of a movement of the closure element.

39. A method for operating a pressure wave generator with a main explosion chamber and an auxiliary explosion chamber, according to claim 36, comprising the repeated execution of the following steps:
filling the main explosion chamber and the auxiliary explosion chamber each with an explosive mixture;
igniting an explosion in the auxiliary explosion chamber;
leading the explosion from the auxiliary explosion chamber through an ignition conduit, wherein this leading is interrupted by an ignition conduit valve;
opening the main explosion chamber with respect to an outlet by way of opening a closure element;
opening the ignition conduit valve and by way of this leading the explosion into the main explosion chamber and igniting an explosion in the main explosion chamber; and
discharging explosion gases through the outlet out of the main explosion chamber.

40. The pressure wave generator according to claim 36, wherein an element of the ignition conduit valve is formed by a part of the closure element or is fixedly connected to the closure element.

41. The pressure wave generator according to claim 40, wherein the closure element comprises an opening or a recess which acts as an ignition conduit or is part of the ignition conduit, and the opening is releasable by way of a movement of the closure element from the closure position into the opening position.

42. The pressure wave generator according to claim 36, wherein the closure element can be brought from the closure position into the opening position by way of an explosion in the auxiliary explosion chamber.

43. The pressure wave generator according to claim 42, with a spark-generating ignition means, in particular a spark plug, for activating the explosion in the auxiliary explosion chamber, and a second filling conduit for filling the auxiliary explosion chamber, wherein the second filling conduit is not identical to the ignition conduit.

44. The pressure wave generator according to claim 42, with an ignition means which can be permanently supplied with energy, in particular a glow plug, for triggering the explosion in the auxiliary explosion chamber, wherein the ignition conduit is arranged for filling the auxiliary explosion chamber from the main explosion chamber.

45. The pressure wave generator according to claim 36, wherein the closure element can be brought from the closure position into the opening position by way of its own actuator, in particular a pneumatic actuator.

46. A method for the operation of a pressure wave generator with a main explosion chamber and with an auxiliary explosion chamber, in particular according to claim 36, comprising the repeated execution of the following steps:
- filling the main explosion chamber with an explosive mixture;
- moving a closure element in an opening direction;
- opening an ignition conduit valve, in particular by way of moving the closure element and by way of this leading the explosive mixture from the main explosion chamber into the auxiliary explosion chamber;
- igniting an explosion in the auxiliary explosion chamber;
- leading the explosion from the auxiliary explosion chamber through the ignition conduit into the main explosion chamber;
- further moving the closure element in the opening direction for opening the main explosion chamber with respect to an outlet by way of opening a closure element, and discharging explosion gases through the outlet out of the main explosion chamber.

47. The method according to claim 46, wherein the igniting of the explosion in the auxiliary explosion chamber is effected by way of ignition means which can be constantly supplied with energy, in particular a glow plug.

48. A method for operating a pneumatic actuator which comprises:
- a first piston surface which acts counter to a gaseous working medium in a first volume, wherein a pressure in the first volume effects an actuator force in a first direction upon the first piston surface;
- a second piston surface which acts counter to the gaseous working medium in a second volume, wherein a pressure in the second volume effects an actuator force in a second direction which is opposite to the first direction, upon the second piston surface;

with the following steps:
- filling the first volume with a gaseous working medium which is under pressure by means of a filling valve;
- pressure compensation between the first volume and the second volume through a throttle and, by way of this, on account of a surface area difference between the first piston surface and the second piston surface, moving the actuator in the first direction;
- discharging at least a part of the gaseous working medium out of the first volume;
- by way of a pressure drop in the first volume and in the second volume, wherein said pressure drop is more rapid in the first volume than in the second volume, moving the actuator in the second direction;

wherein, with only the filling valve and the inlet/outlet opening, a to and fro movement of the actuator is realised.

* * * * *